March 6, 1928.  T. R. MICHAELIS  1,661,954
GARDEN TOOL
Filed Feb. 15, 1927
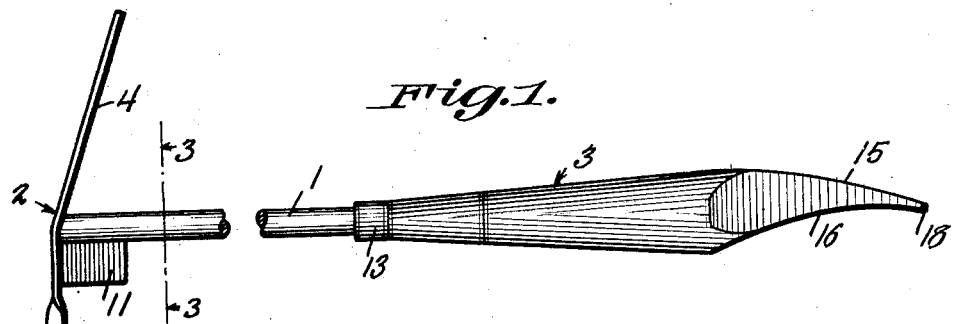
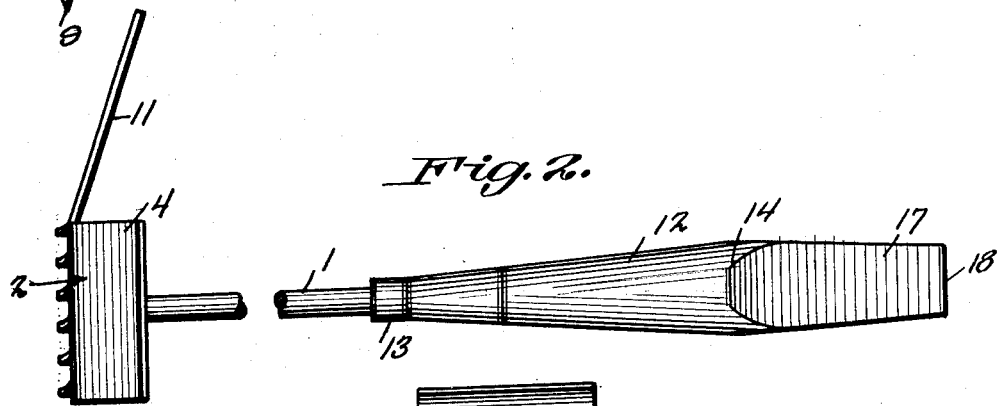
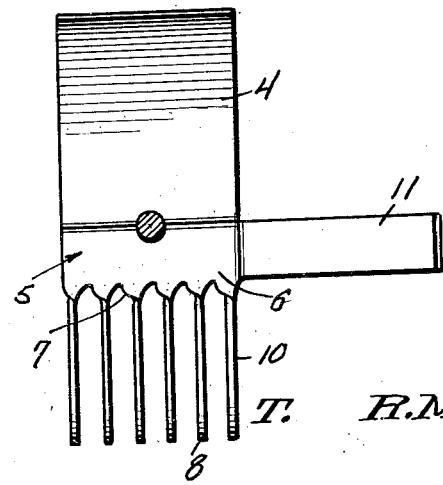

Patented Mar. 6, 1928.

1,661,954

UNITED STATES PATENT OFFICE.

THEODORE R. MICHAELIS, OF MARINETTE, WISCONSIN.

GARDEN TOOL.

Application filed February 15, 1927. Serial No. 168,430.

This invention relates to a garden tool and has for its object to provide, in a manner as hereinafter set forth, a tool of such class including means whereby it can be utilized for various purposes about a garden.

Further objects of the invention are to provide, in a manner as hereinafter set forth, a tool of the class referred to with means for conveniently thinning out the growing plants, removing weeds from narrow spaces, transplanting, raking out loose plants and weeds after loosening them, hoeing between rows of plants, loosening up the small plants, lifting the plants, forming holes for the reception of the plants, positioning the plants in the holes and packing the dirt over the roots of the plants.

Further objects of the invention are to provide, in a manner as hereinafter set forth, a garden tool which is simple in its construction and arrangement, strong, durable, compact, thoroughly efficient in its use, conveniently handled and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to, which fall within the scope of the claim hereunto appended.

In the drawings wherein like reference characters denote corresponding parts throughout the several views:

Figure 1 is a view of a tool in accordance with this invention, looking towards one side thereof and broken away.

Figure 2 is a view similar to Figure 1 looking towards the other side of the tool.

Figure 3 is a section on line 3—3 Figure 1.

Referring to the drawings in detail 1 denotes the handle of the tool, and which can be of any suitable cross section, preferably cylindrical and said handle 1 is of any appropriate length. One end of the handle 1 is formed integral with a ground working element referred to generally by the reference character 2, and connected to the other end of the handle 1 is a ground working element referred to generally by the reference character 3 and which forms a continuation of the handle.

The element 2 is in the form of a substantially rectangular unitary body constructed from metallic material of the desired gauge and comprises a rectangular blade 4 which forms a hoe, a lengthwise slitted rectangular part 5 forming a rake and a side wall blade 11 which provides a weeder. The part 5 includes an oblong head portion 6, having projecting from its outer side a series of spaced tines or teeth 8. The material freed by the slits, formed in the part 5, is torsionally twisted as at 7, to provide the series of opposed tines or teeth 8, having their broad surfaces opposing each other. The free ends of the teeth 8 are pointed as at 9. The side edges 10 of the teeth 8 are offset with respect to the faces of the head portion 6 of the part 5.

The blade 4 is of a width coextensive with the length of the head portion 6 and projects rearwardly from the inner side of the latter at an outward inclination. An oblong blade 11 has one end thereof integral with one end of the head portion 6 and extends rearwardly therefrom at an outward inclination. The width of the blade 11 is substantially the same as that end of the head portion 6. The length of the blade 11 is greater than the length of the head portion 6. The width of the blade 11 is materially less than the width of the blade 4. The handle 1 at its forward end is secured at the point of juncture of the blade 4 with the head portion 6.

The element 3 comprises a tapered part 12, having its smaller end 13 secured to the handle 1. The tapered part 12 merges into an outer part 14 which tapers in an opposite direction with respect to the part 12 and has its side faces 15 and 16 of arcuate contour, but with the face 16 upon a greater arc than the face 15 thereby providing what may be termed a spoon or dished shaped portion 17 having a pointed end 18. The spoon shaped portion 17 gradually increases in width from the tapered part 12 to the pointed end 18 of the part 14. The element 3 is used for making holes and loosening up the small plants and packing dirt over the roots, and is so shaped that it can be readily pushed in the ground to form a hole, as well as pushed in the ground to lift the plants and further for placing the plants in the holes and packing the dirt over the roots of the plants.

The tool as an entirety, provides means for taking out plants, forming holes, packing dirt over the roots, a weeder in narrow spaces, thinning out plants where too thick, hoeing between the rows of plants, and raking loose weeds after they are loosened, therefore it is thought the many advantages of a garden tool, in accordance with this invention can be readily understood, and although the preferred embodiment of the invention is as illustrated and described, yet it is to be understood that changes in the details of construction can be had which will fall within the scope of the invention as claimed.

What I claim is:

A ground working instrument comprising an oblong head portion, a series of tines integral with the outer side thereof, a rectangular blade of a width coextensive with the length of said head portion, said blade having its inner end formed integral with the inner side of the head portion and extending rearwardly at an outward inclination with respect to said head portion, an oblong blade integral with one end of said head portion and of a width substantially the same as such end, said oblong blade extending rearwardly from said head and at an outward inclination, and a handle secured at the juncture of the rectangular blade and head portion.

In testimony whereof, I affix my signature hereto.

THEODORE R. MICHAELIS.